United States Patent [19]

Meisel et al.

[11] 3,968,500

[45] July 6, 1976

[54] ELECTRODE PRINTING HEAD AND METHOD FOR MAKING THE SAME

[75] Inventors: Gerhard Meisel, Ulm (Danube); Helmut Süssenbach, Thalfingen; Harry Zimmermann, Oberelchingen, all of Germany

[73] Assignee: Licentia Patent-Verwaltungs-G.m.b.H., Frankfurt am Main, Germany

[22] Filed: Sept. 24, 1974

[21] Appl. No.: 508,868

[30] Foreign Application Priority Data

Sept. 27, 1973 Germany............................ 2348556

[52] U.S. Cl............................... 346/139 C; 29/592; 174/72 B; 346/74 SB

[51] Int. Cl.².......................................... G01D 15/08

[58] Field of Search.......... 346/139 C, 74 EH, 74 S, 346/74 SB, 74 SC, 74 EL; 29/592, 624, 625; 174/72 B, 117 FF

[56] References Cited

UNITED STATES PATENTS

| | | | |
|---|---|---|---|
| 2,719,775 | 10/1955 | Erving | 346/139 C |
| 3,010,778 | 11/1961 | Shaler | 346/74 |
| 3,391,456 | 7/1968 | Gannoe | 29/625 |
| 3,618,118 | 11/1971 | Lloyd | 346/74 |
| 3,693,185 | 9/1972 | Lloyd | 346/139 C |
| 3,771,634 | 11/1973 | Lamb | 197/1 R |

*Primary Examiner*—Joseph W. Hartary
*Attorney, Agent, or Firm*—Spencer & Kaye

[57] ABSTRACT

A method of making an electrode printing head comprises the making of two separate sheet metal parts each formed of a series of juxtapositioned, spaced electrodes held together by at least one interconnecting web; and securing the two sheet metal parts to insulating components of the printing head in such a manner that the electrodes of the two parts are in a non-contacting, intermeshing relationship with respect to one another, whereby the electrodes of the one and the other sheet metal part alternate with one another and form an electrode row on the printing head. Subsequent to the securing step, the interconnecting webs are removed.

5 Claims, 2 Drawing Figures

ELECTRODE PRINTING HEAD AND METHOD FOR MAKING THE SAME

BACKGROUND OF THE INVENTION

This invention relates to a method of making an electrode printing head for an electric mosaic printer. The electrode printing head is of the type which has a plurality of juxtapositioned and mutually insulated strip-like electrodes which are supported at least by one insulating portion of the printing head. The electrodes are made from sheet metal by etching or stamping and after mounting them on the insulating portion of the printing head, the connecting webs which had served the purpose of positioning the electrodes during the etching operation are removed.

Electrode printing heads having a great number of juxtapositioned electrodes are known in the art. These electrodes conventionally glide in a springing manner over a substrate (imprint carrier) which is provided with an electrically conductive layer. When an electric current is applied, those portions of the electrically conductive layer which are disposed beneath the energized writing electrodes are removed and the dyed insulating layer of the imprint carrier becomes visible as dots. By means of proper electric control of the individual electrodes with the simultaneous feed of the substrate, desired characters may be composed with the individually printed dots.

In order to obtain an as exact representation of the character as possible, it is desirable to arrange the individual electrodes as close to each other as possible. In order to obtain a good uniformity of the individual electrodes, it is further known to make the same by etching or stamping from a sheet metal by leaving first the interconnecting web portions in place which are removed only after the electrodes are mounted on insulating components of the printing head.

It has been found that even when the electrodes are made by etching or stamping, the distances between the electrodes may not be reduced to an arbitrarily small value, because, among other reasons, for these electrodes expediently a material is used which, on the one hand, has a small consumption rate and, on the other hand, has a satisfactory springing action.

SUMMARY OF THE INVENTION

It is an object of the invention to provide a new method for the manufacture of electrodes of the afore-outlined type by means of which, particularly with regard to the distance between the individual electrodes, an improved electrode printing head can be manufactured.

It is a further object of the invention to provide, as a result of the method according to the invention, an improved electrode printing head from which the above discussed disadvantages are eliminated.

These objects and others to become apparent as the specification progresses, are accomplished by the invention, according to which, briefly stated, for each printing head there are used two etched or stamped sheet metal parts which are supported by the insulating portion of the printing head and which are arranged in an intermeshing relationship with respect to one another in such a manner that the electrodes of the one sheet metal portion extend into the intermediate spaces between the electrodes of the other sheet metal portion without a contact between any electrodes.

A significant advantage of the invention resides in the fact that by using two etched or stamped sheet metal portions, extremely small distances between the individual electrodes may be provided, while, at the same time, it is ensured that the electrodes are shaped in a substantially uniform manner. By a further development of the invention, according to which two identical etched or stamped portions are used in an intermeshing relationship as the mirror image of one another, an additional advantageous improvement regarding the uniformity of the distances between the electrodes can be achieved. Still another advantage is accomplished by the fact that within one row, several electrodes may be arranged into groups, whereby the individual groups may have a greater distance from one another than the distance between the electrodes forming one and the same group. By reversing (turning over) one of the etched or stamped sheet metal parts with respect to the other and thus interconnecting the two parts as each other's mirror image, the above-outlined grouping may be achieved in a simple manner while simultaneously the distances are maintained with the greatest possible accuracy.

DESCRIPTION OF THE PREFERRED EMBODIMENTS

Figure 1:
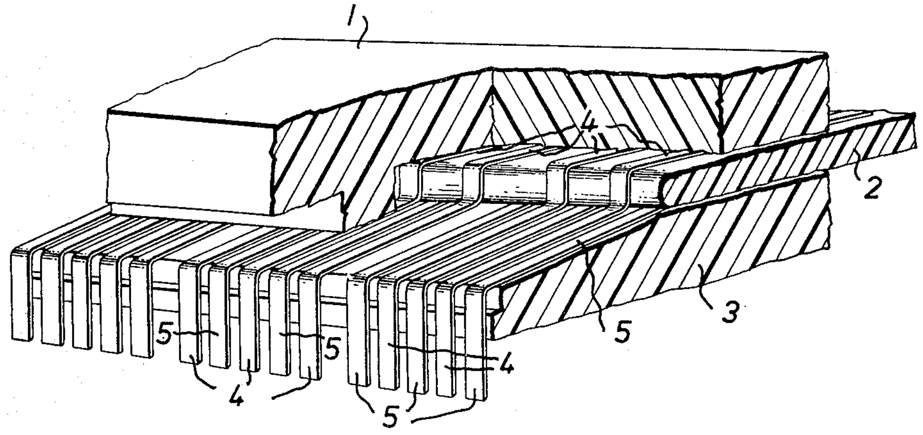
FIG. 1 is a perspective view, partially broken away, of a preferred embodiment of the invention.

Turning now to FIG. 1, there is shown an electrode printing head having a plurality of individual electrodes 4 and 5 alternating with one another to form a juxtapositioned series. As it will be discussed below, all the electrodes 4 originally belonged to a first sheet metal part, while all the electrodes 5 originally belonged to a second sheet metal part.

The individual electrodes 4 and 5 are secured to insulating portions 1, 2 and 3 forming part of the electrode printing head. In the embodiment illustrated, the electrodes 4 are angularly bent so that between the rear terminus of the electrodes 4 and the rear terminus of the electrodes 5 an insulating component 2 may be inserted. An important advantage of this construction resides in the fact that at the rear terminus the electrode ends which are to be contacted are located in two planes and have an outer distance with respect to one another which facilitates the contacting.

The two insulating components 1 and 3 serve as closure portions and are shaped in a desired manner. The securing of the electrodes may be effected, for example, by pressing together the two closure plates 1 and 3 whereby, with the aid of the interposed insulating component 2, the electrodes are securely positioned by clamping. According to another type of securing the electrodes may be glued or cast.

As illustrated in FIG. 1, the electrodes are grouped together in a group of five, whereby between the individual groups there are maintained distances that are greater than the distances between the electrodes forming one and the same group. By virtue of the manufacturing method according to the invention, that is, by using two identical sheet metal parts and intermeshingly arranging the two parts as mirror images of one another, such grouping may be accomplished in a simple manner.

Figure 2:
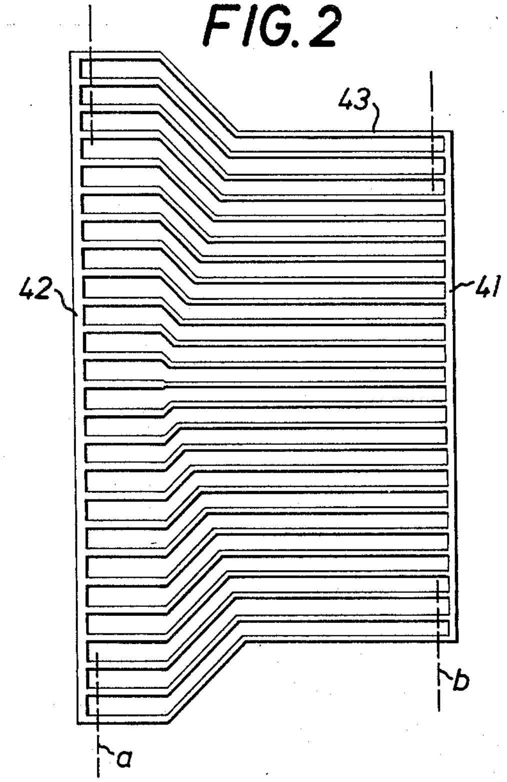
FIG. 2 is a top plan view of a sheet metal part shown during a manufacturing stage of the electrodes.

Turning now to FIG. 2, there is illustrated an etched or stamped sheet metal part 43 which has a plurality of parallel-arranged electrodes which are separated from one another by slots and which at opposite ends, are maintained in position by web portions 41 and 42 connecting the electrodes to one another. The sheet metal part 43 is expediently made of a chromium-nickel steel alloy. For the manufacture of an electrode printing head according to the invention, preferably two identical sheet metal parts 43 are arranged in an intermeshing relationship after first reversing one of the parts, so that viewing them from one side, they form mirror images of one another. Subsequently, the two parts, as shown in FIG. 1, are secured to the insulating components of the electrode printing head. After the two sheet metal parts are attached to the electrode printing head in such a manner that the electrodes are arranged in one row without contacting one another, the webs 41 and 42 are removed for example, by cutting each sheet metal part along lines *a* and *b* respectively. Thus, the individual electrodes are insulated from one another and, at the same time, have the desired mutual distances.

In order to obtain the desired stability of the electrodes, the thickness of the sheet metal parts is expediently between approximately 0.1 to 1 mm.

The etching or stamping of such sheet metal parts is relatively difficult if the slots to be provided by etching or stamping are very narrow. Thus, a sheet metal part, particularly one that is made of chromium-nickel steel alloy, can be etched or stamped only with difficulty and in an imprecise manner if the slots between the electrodes are to correspond to the distances of the electrodes in the completed electrode printing head. By virtue of the method according to the invention, the sheet metal parts may be provided with wider slits which can be relatively easily and precisely stamped or etched. The desired small distances in the finished electrode printing head are obtained then by intermeshingly arranging the two etched or stamped sheet metal parts with respect to one another.

It will be understood that the above description of the present invention is susceptible to various modifications, changes and adaptations, and the same are intended to be comprehended within the meaning and range of equivalents of the appended claims.

We claim:

1. In an electrode printing head having a plurality of strip-shaped electrodes arranged in a row in a juxtapositioned, mutually insulated, spaced relationship and being supported in insulating means forming part of the printing head, the improvement wherein said row of electrodes being constituted by electrodes of identically shaped first and second sheet metal parts, said first sheet metal part being in a reversed position with respect to said second sheet metal part and the electrodes of said first sheet metal part being in an intermeshing relationship with the electrodes of said second sheet metal part, whereby each electrode of said first sheet metal part being situated, without touching, in the space provided between adjacent electrodes of said second sheet metal part.

2. A method of making an electrode printing head of the type that includes a plurality of strip-shaped electrodes arranged in a row in a juxtapositioned, mutually insulated, spaced relationship and being supported in insulating means forming part of the printing head, comprising the steps of a. making two identically configured sheet metal parts each formed of a series of juxtapositioned, spaced electrodes held together by at least one interconnecting web;

b. securing both sheet metal parts to said insulating means in a reversed position and in an intermeshing relationship with respect to one another, whereby the electrodes of the one sheet metal part alternate with the electrodes of the other sheet metal part and whereby the electrodes of the one and the other sheet metal part together form said row;

c. subsequent to step (b), removing said interconnecting web.

3. A method as defined in claim 1, wherein said sheet metal parts are made of a chromium-nickel steel alloy and said sheet metal parts are made by etching.

4. A method as defined in claim 1, wherein said sheet metal parts are made by stamping.

5. A method as defined in claim 1, wherein said sheet metal parts are made by etching.

* * * * *